United States Patent [19]

Ames et al.

[11] Patent Number: 5,082,582

[45] Date of Patent: Jan. 21, 1992

[54] NUCLEATING DEVICE FOR THERMAL ENERGY STORAGE COMPOSITIONS

[75] Inventors: Douglas A. Ames, Manhattan Beach; Ingval Hageland, Costa Mesa, both of Calif.

[73] Assignee: Electric Power Research Institute, Palo Alto, Calif.

[21] Appl. No.: 607,698

[22] Filed: Nov. 1, 1990

Related U.S. Application Data

[63] Continuation-in-part of Ser. No. 313,049, Feb. 21, 1989, Pat. No. 4,971,713.

[51] Int. Cl.$^5$ .............................................. C09K 5/00
[52] U.S. Cl. ..................................... 252/70; 165/10; 23/300; 23/305 F; 252/62.51; 252/62.56
[58] Field of Search ............... 252/70, 62.52, 62.56, 252/62.6, 62.51; 165/10; 23/300, 305 F; 422/245

[56] References Cited

U.S. PATENT DOCUMENTS

| | | | |
|---|---|---|---|
| 3,596,034 | 7/1971 | Mekjean | 165/10 |
| 3,720,198 | 3/1973 | Laing et al. | 252/70 |
| 3,788,819 | 1/1974 | Oden | 23/300 |
| 4,208,294 | 6/1980 | Khalafalla et al. | 252/62.52 |
| 4,233,960 | 11/1980 | Johnson | 165/104.11 |
| 4,244,148 | 1/1981 | Chabanon et al. | 252/70 |
| 4,372,866 | 2/1983 | Ehlers et al. | 252/70 |
| 4,971,713 | 11/1990 | Ames | 252/70 |

FOREIGN PATENT DOCUMENTS

83/01956  6/1983  World Int. Prop. O. .

*Primary Examiner*—Paul Lieberman
*Assistant Examiner*—Christine A. Skane
*Attorney, Agent, or Firm*—Watson, Cole, Grindle & Watson

[57] ABSTRACT

A nucleating agent for NaOH/H$_2$O solutions comprises a metal bar, magnetic tape adhered to a surface area of the bar and particulate magnetite on the surface of the tape. The magnetic field created by the tape holds the bar, tape and magnetite in fixed relation to each other.

15 Claims, 1 Drawing Sheet

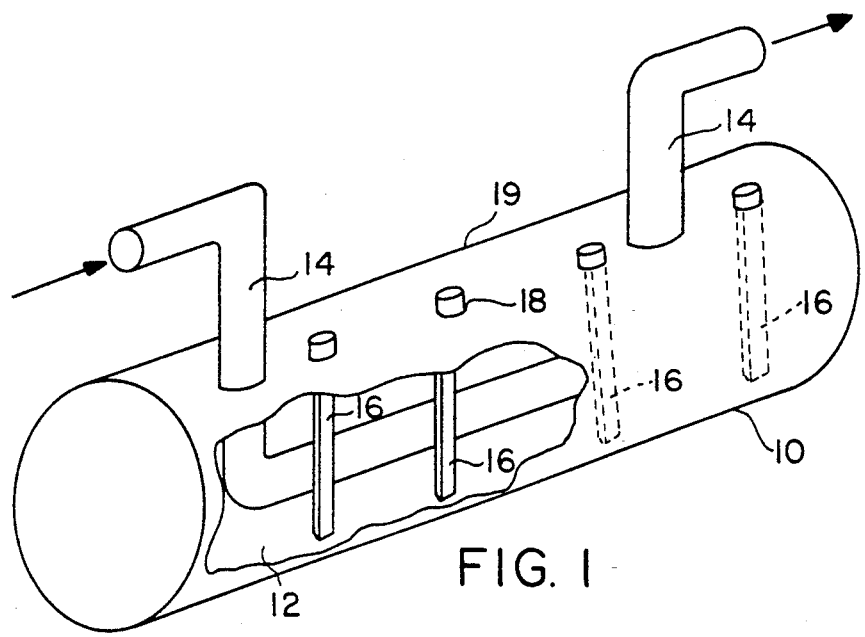
FIG. 1
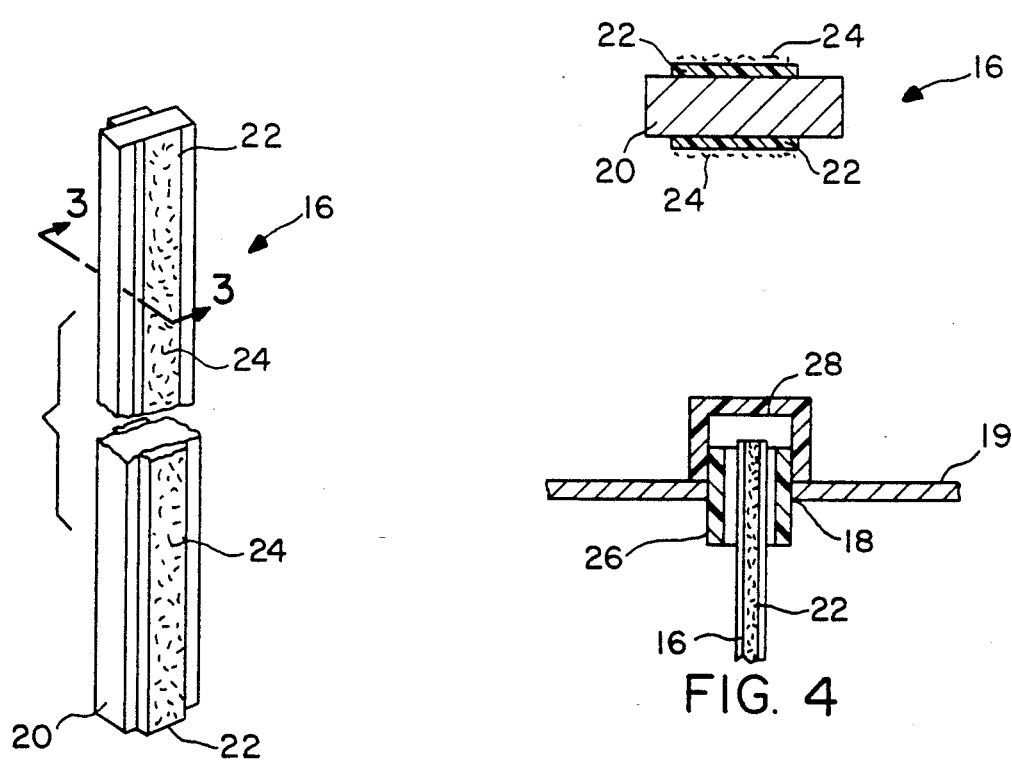
FIG. 2
FIG. 3
FIG. 4
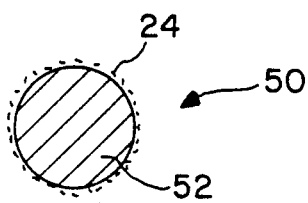
FIG. 5

NUCLEATING DEVICE FOR THERMAL ENERGY STORAGE COMPOSITIONS

This is a continuation-in-part application based on prior, co-pending application Ser. No. 313,049, filed Feb. 21, 1989, in the name of Douglas A. Ames, now U.S. Pat. No. 4,971,713.

BACKGROUND OF THE INVENTION

1. Field of the invention

The present invention refers generally to the field of thermal energy storage, and more particularly to the storage of such energy by utilizing phase change materials. Phase change materials, hereinafter sometimes refer to as PCM's, are chemical compositions that store heat energy in one phase and, in another phase, either release such energy in the form of heat, or acquire heat from a surrounding fluid as the PCM undergoes a change of phase.

2. State of the Art

Tge field of thermal energy storage ("TES") is believed to be in its commercial infancy. While there are presently a plurality of installations in commercial operation in the United States, the full market potential of "coolness" storage, in particular, has yet to be achieved. In general, TES installations use PCM's to store coolness, rather than heat. Such PCM's are chemical compositions that exhibit a freezing point plateau at temperatures below about 50° F. Since electric utilities almost universally employ time-of-use rates for industrial users, the rate being divided into a demand charge and a usage charge, where a commercial operation can employ electricity during off-peak hours rather than during peak periods, it is highly desirable to do so from an economic view. For off-peak usage, both the demand and energy charges that are levied for energy use during peak periods will be diminished and, instead, the same usage made during off-peak periods will result in a much lower total charge to the customer.

While water may be defined as a phase change material, it has long been apparent that one may freeze water during off-peak hours, such as the early morning hours when the load on the utility's generating capacity is minimal, then use the ice created during those off-peak hours, either directly or by melting and mixing with line water, during peak hours to air-condition an installation. At the present time there are many commercial entities seeking to capitalize on storage of "coolness" through the employment of a water-ice-water change of phase. However, the drawbacks of ice storage are manifest.

It will be readily apparent that energy usage is magnified when water is frozen, since in order to accomplish such freezing within a reasonable period of time, the freeze-inducing medium must be at a temperature well below that at which water freezes: a medium at a temperature of about 26° F. must be employed, which means that the medium cannot be water, but usually is a mixture of water and ethylene glycol, i.e., antifreeze. The environmental hazards of such usage, as well as the fact that the energy employed to chill the cooling medium to 26° F. is well in excess of that required to chill water to the desired temperature for air-conditioning, generally between 41° and 47° F., are apparent. Thus, ice storage does not result in conservation of energy, even though electric utilities can generally produce electricity more cheaply at night when ambient temperatures are low.

There has been widespread commercial use of one PCM other than water. A PCM that meets the general requirements for all PCMS: (1) maintenance of a near constant temperature throughout the phase change cycle, also referred to as a melting/freezing point plateau, (2) a relatively high latent heat of fusion, and (3) a relatively high product density: is based on a eutectoid salt composition employing sodium sulfate decahydrate. While such phase change materials employing $Na_2SO_4 \cdot 10H_2O$ are readily available, such mixtures have a minimal freezing point of 47°–48° F. In many instances, it has been found desirable to employ water for air-conditioning at temperatures below 47°–48° F., for example, water at 41° F. It will be apparent that, unless a chiller is to be used during peak periods to further cool water from a cooling tank employing sodium sulfate decahydrate-based PCM's, one cannot obtain water at 41° F. when the melting point of the PCM is 47° F., absent the inefficient utilization of the specific heat at a PCM frozen below its melting point.

As disclosed in the application of which this application is a continuation-in-part, it has more recently been learned that certain $NaOH/H_2O$ solutions can be employed as a PCM for cool storage. Thus, an aqueous solution of about 46%–47% NaOH-in-water has a freezing/melting point plateau at approximately 41° F., which in many instances is highly favorable vis-a-vis a sodium sulfate decahydrate PCM with a 47° F. plateau. For uses where lower than 47° F. water is desired for air-conditioning the $NaOH/H_2O$ solution is exceptionally well-suited for employment as a PCM.

One problem that has been noted with the use of $NaOH/H_2O$ PCM's is that they have significant tendency to supercool. In the prior, sole application a significant advance in the art was disclosed by providing several nucleating agents that inhibited such supercooling. Among those nucleating agents, and highly desirable because it is inexpensive and readily available, was magnetite, which is mineral, commercial grade of $Fe_3O_4$, also sometimes known as magnetic iron oxide. While magnetite in all of its forms appears to be a step forward in its use as a nucleating agent for sodium hydroxide/water solutions and, in particular, for a 47% sodium hydroxide/water composition that exhibits a freezing point plateau at about 41° F., simply placing the magnetite in the NaOH/water solution and lowering the temperature thereof below 41° F. presents problems after many, repeated freeze/thaw cycles.

Although the use of finely divided magnetite powder is effective in nucleating an NaOH/water solution, some of that nucleating agent seems to supersaturate the PCM, itself, although under ambient circumstances, $Fe_3O_4$ is only slightly soluble in dilute NaOH. In that case the magnetite had to be added to its saturation point, which appears to be about 3% by weight of the NaOH/water PCM. Then more magnetite had to be added so that a supersaturated solid always remained on the bottom of the container. Often, magnetite was added in about 4% to 6% by weight of the PCM. Since the magnetite nucleates, but does not take part in the freezing of the NaOH/water solution, and thus does not appear to contribute to the storage of coolness, the need to supersaturate the solution with magnetite is deemed undesirable.

Another problem that has been presented is that, as with any solid with a specific gravity greater than that of the PCM liquid, the magnetite would tend to sink to the bottom of the container for the PCM. When resting on the bottom, the magnetite was only presented to the lower portion of the PCM solution and, on occasion, tended to become "crusted over" after continued use. Whatever the material that formed on the surface of the magnetite, it inhibited the magnetite from performing its nucleating function.

Thus, one object of the present invention is to improve distribution of the magnetite or other nucleating agent throughout the body of the phase change material in which it is acting as a nucleating agent, thereby improving the efficacy of the nucleating agent.

It is another object of our invention to provide a nucleating agent that will be maintained in a PCM solution in a position other than precipitating to the floor of the PCM container, thereby presenting more faces on which nucleation can occur throughout the body of the PCM.

It is another object of our invention to provide a means for employing magnetite as a nucleating agent throughout a PCM in which the magnetite is maintained in a position in which it will not tend to crust over with other deposits, such has been found to occur when the magnetite remains on the bottom of the PCM container.

It is still another object of our invention to provide a means for positioning a nucleating agent in a body of PCM so that solubility of the nucleating agent in the PCM will be minimized and there will be no need to supersaturate the PCM solution with the nucleating agent, in this case magnetite.

In order to achieve the above objects, it has been determined that the magnetic properties of the magnetite can be utilized to suspend the magnetite or other ferromagnetic material in a more advantageous position where there will be far greater exposure of the particles of magnetite to the body of the $NaOH/H_2O$ solution. This concept is embodied in various forms, and results in a device which greatly enhances the nucleating properties of the magnetite.

SUMMARY OF THE INVENTION

In one form, the present invention comprises the combination of a sodium hydroxide/water solution having a freezing point plateau at a temperature at which it is adapted for thermal energy storage. The combination also includes a nucleating device positioned in the solution. The nucleating device comprises an element that creates a magnetite field, and a magnetic material located in that field and magnetized thereby. The magnetic material is capable of nucleating the sodium hydroxide/water solution, and is maintained in contact with the solution by the magnetic field created by the element of the nucleating device.

With somewhat greater specificity, the inventive combination set forth above is one in which the magnetic material is a finely divided ferromagnetic composition, such as $Fe_3O_4$, magnetic iron oxide, or commercially available magnetite. Also, the sodium hydroxide/water solution is one in which the ratio is about 47% NaOH to 53% $H_2O$, which solution has a freezing point plateau at about 41° F.

In the form of a subcombination, the nucleating device of our invention constitutes the step forward in the art. That nucleating device, per se, comprises an element creating a magnetic field and a magnetic material located in the field and magnetized and held in position by the field. As so positioned, the magnetic material, e.g., commercially avaiable magnetite, is capable of nucleating the medium.

The nucleating device may take several forms. In one form the element that creates the magnetic field is a core formed from a material that will withstand degradation upon exposure to alkalis, and a magnetic tape adhered to a surface of the core. The tape creates a magnetic field. The core can be in a form of an elongated rod, which may be of any convenient cross-section, e.g., circular, rectangular, or square, and the tape may be adhesively secured to the core. Once again, the magnetic material is held on the tape by the magnetic field created by the tape wrapped about the core. In another form the core may be a bar magnet, such as a permanent magnet or bar of hard, ferromagnetic material that has been magnetized to saturation, in which case it is not necessary to utilize magnetic tape. In any case, the nucleating device may be positioned in the solution by simply resting therein or, preferably, extending diametrically from one wall of the container for the PCM through the interior of the tank and into contact with the opposite wall.

These and other objects, features, and advantages of the present invention will become more readily apparent when considered in connection with preferred embodiments of the invention, which are described in detail hereinafter. In connection with such detailed descriptions, reference will be made to illustrations thereof in the accompanying drawings, in which:

FIG. 1 is a perspective view partially broken away, of a tank containing a preferred nucleating device according to the present invention;

FIG. 2 is an enlarged perspective view of the nucleating device shown in FIG. 1, a central portion of the device being broken away for space considerations;

FIG. 3 is a cross-sectional view of the nucleating device of FIG. 2 taken along line 3—3;

FIG. 4 is a cross-sectional, enlarged view of a portion of the tank shown in FIG. 1, illustrating the manner in which the nucleating device is incorporated in the tank, and FIG. 5 is a cross-sectional view of another embodiment of a nucleating device according to the present invention.

DETAILED DESCRIPTION OF PREFERRED EMBODIMENTS

As has been pointed out, it is basic to the present invention that the properties of a magnetic material, such a magnetite, be utilized in order to present the magnetite in the best possible position for nucleating, in this case, a sodium hydroxide/water solution. The presently considered best mode of such a presentation is shown in FIG. 1, albeit only diagrammatically and not to scale.

As seen in FIG. 1, a tank 10, which may be of any convenient shape and in its presently preferred form is cylindrical, is used to hold a solution 12 of, most preferably, a 47% sodium hydroxide-in-water solution. In this embodiment, solution 12 in tank 10 is adapted to exchange heat with a fluid which, for the purpose of illustration only, is shown flowing through conduit 14 partially immersed in the solution. A plurality of nucleating devices 16 in accordance with the present invention are contained in tank 10 and are inserted into solution 12. In their inserted position, nucleating devices 16 extend substantially vertically through apertures 18 in top wall 19 of tank 10 (see FIG. 4) down to the bottom of the tank and rest thereon. Nucleating devices 16 are positioned in tank 10 such that a large majority of the surface area of the nucleating device will be located in the sodium hydroxide solution 12, which normally will be present in the tank at a level near the upper extremity of the device. The number of nucleating devices 16 in tank 10 may vary considerably, the number shown being for illustration only.

An enlarged view of one of the nucleating devices 16 is illustrated in FIGS. 2 and 3. It will there be seen that the most preferred nucleating device is in the form of an elongated core 20 which is rectangular in cross-section. Suitable materials for core 20 include polymeric materials, metals such as various steels and the like. Magnetic tape 22, which is presently in the form of Scotch-Brand magnetic tape 22 manufactured by 3M Company, of St. Paul, Mn, extends along the length of both major side walls of core 20. That tape 22 has the capability of creating a magnetic field. When placed in contact with still core 20, it creates a magnetic field between it and the core, and is held to the core by the magnetic field. For example, in the case of a rectangular core 20, at least one and up to four sides of the core 20 may have the tape 22 overlying a portion of the surface, although as illustrated only to two opposed sides of greatest surface area have the tape 22 overlying them. The amount of tape 22 used will generally correspond to the amount of nucleating agent required for adequate operation of the tank.

Since the magnetic tape 22 creates a magnetic field, a nucleating agent 24, such as commercially available magnetite, which is readily obtainable in particulate or powdered form is coated onto the exposed surface of the tape 22 secured to the core 20. As so coated, magnetized particles 24 will be exposed and brought into contact with the surrounding solution, yet will be held on the tape by virtue of the magnetic field created by the magnetic tape 22.

FIG. 4 illustrates one manner of closing the tank 10 about nucleating devices 16 yet allowing ready access to the devices for maintenance and replacement. Secured in aperture 18 in tank 10 is nipple 26, preferably formed from material inert to the solution 12, which has threads on its exterior surface. Nucleating device 16 extends downwardly through nipple 26 into tank 10 to its bottom and projects upwardly somewhat above or at the top of the nipple 26 so that the nucleating device can be gripped and withdrawn from tank 10. Closing the upper end of nipple 26 is cap 28 having internal threads mating with the exterior threads on the nipple. Like nipple 26, cap 28 may be made of various inert materials, preferably an inert polymeric material as is shown. Cap 28 helps prevent the ingress of contaminants to tank 10 as well as inhibiting spillage or leakage of solution 12.

Still another form of our invention is illustrated in FIG. 5. In that form, nucleating device 50 simply comprises a permanent or bar magnet 52. Nucleating agent 24, such as magnetite in powdered or particulate form, is brought into contact with the outer surface of bar magnet 52 and adheres thereto, and is likewise exposed to the sodium hydroxide solution when the bar magnet is insert into tank 10 as is illustrated in FIG. 1.

In use, a fluid at a temperature less than the freezing-melting point plateau of the solution enters conduit 14, which is diagrammatically illustrated only, passes in heat transfer contact with the NaOH/H$_2$O solution to transfer "coolness" or remove heat from the solution, and continues until the solution is frozen. The rods 16 coated with magnetite 24 inhibit supercooling of the solution, which is designed as a 47% solution having a freezing-melting point plateau at about 41° F. When the solution is frozen, the passage of fluid, preferably water, through the conduit ceases. Then, when it is desired to chill a fluid, the fluid is passed through the conduit 14, and heat is removed from the fluid by the surrounding, frozen NaOH/H$_2$O solution.

As will be apparent, the applicability of the general principle of utilizing the magnetic properties of magnetite in order to hold the magnetite in position to nucleate a sodium hydroxide solution is simplicity, itself. However, the basis for such use of magnetite or other forms of compositions which nucleate sodium hydroxide/water solutions and also are categorized as magnetic materials, is the fact that the magnetic properties of the magnetite are fully utilized in order most effectively to enable the nucleating property of the magnetite to perform its function. Thus, according to the present invention it is necessary that the element creating a magnetic field is preferably ferromagnetic. Ferromagnetism is a property exhibited by certain metals, alloys and compositions of the transition (iron group), rare-earth and actinide elements in which, below a certain temperature called the Curie temperature, the atomic magnetic moments of the metal tend to align in a common direction. Ferromagnetism is characterized by the strong attraction of one magnetized body for another. The characteristic property of a ferromagnet, such as a bar magnet or permanent magnet, is that, below the Curie temperature, it possesses a spontaneous magnetization in the absence of an applied magnetic field.

The most preferred material from a commercial point of view is magnetite, a cubic mineral that possesses an inverse spinel structure in which half the ferric iron is tetrahedrally coordinated and the remaining half as well as all ferrous iron are octahedrally coordinated. Thus, the basic formula is Fe$_3$O$_4$. Magnetite is a natural ferrimagnet. While large bodies of ore are found in Sweden, Norway, the Soviet Union and Canada, it is a common accessory mineral throughout the world. Magnetite is preferred to hematite, Fe$_2$O$_3$, which is less strongly magnetic, although both are deemed magnetic materials.

In the FIGS. 1 to 4 embodiment, the core may be formed from any material that is resistant to sodium hydroxide solution. A steel rod may be used for this purpose and a magnetic tape secured thereto. What is presently conceived as the best mode of our invention, the magnetic attraction between the tape 22 and bar 20 is the sole means of locating the tape on the bar, according to the tape and surface of the bar a suitable adhesive may also be employed. Where no magnetic tape is to be utilized, the core will have its own magnetic property, and it is generally preferred that it be in a form of a bar or permanent magnet. Various compositions marketed under the name Alnico have been found suitable for this purpose, the prime requisites being that it will have the ability to create a magnetic field to which magnetite will be attracted and that the magnet, itself, have alkali resistance.

The use of a nucleating device according to the present invention has been found to have many advantageous properties, the foremost of which is an improved nucleating ability to prevent supercooling of a sodium hydroxide/water solution. As disclosed more fully in the co-pending, parent application, the most preferred sodium hydroxide-in-water solution is one in which sodium hydroxide is present in about 47% by weight, which has been found to give rise to a solution having a defined freezing/melting point plateau at about 41° F.

In any TES composition, heat transfer is a necessary adjuvant, i.e., it is desirable that heat or coolness be readily transferred throughout the body of the solution, e.g., so that freezing will take place substantially concomitantly throughout the solution over a plateau that will be a minimal number of degrees F. Use of a nucleating device according to our invention has been found to have an additional advantage: because metallic bars are good conductors of heat, the use of one or more nucleating devices employing such metal bars —and in our present best mode we used eight such bars —will not only assist in nucleation, but will also enable more efficient heat transfer to take place throughout the body of the sodium hydroxide solution. This added function of our nucleating device is an important aid, because freezing or melting is more effective when it takes place at the same pace simultaneously throughout the body of the PCM, as contrasted with localized melting or freezing.

It will be obvious to those of ordinary skill in this art that many alterations and modifications may be made in the preferred embodiments described hereinbefore without departing from the spirit of the invention. Exemplarily, rather than having a core in the form of a bar, the core may be a strip of metal about which the magnetic tape is secured or, indeed, may be a strip of magnetic material capable of inducing a magnetic field. As to all such alterations and modifications, we desire that they be included within the purview of our invention, which is to be limited only by the scope, including equivalents, of the following, appended claims.

We claim:

1. In combination, a sodium hydroxide/water solution having a freezing point plateau such that it is adapted for thermal energy storage, and a nucleating device positioned in said solution, said nucleating device comprising an element creating a magnetic field and a magnetic material located in said field and magnetized thereby, said magnetic material being capable of nucleating said solution to inhibit supercooling thereof and being maintained in contact with said solution by said magnetic field.

2. A combination as claimed in claim 1, in which said magnetic material is a finely divided ferromagnetic composition.

3. A combination as claimed in claim 1, in which said magnetic material is $Fe_3O_4$.

4. A combination as claimed in claim 1, in which said magnetic material is magnetic iron oxide.

5. A combination as claimed in claim 1, in which said magnetic material is commercially available magnetite.

6. A combination as claimed in claim 1, in which said sodium hydroxide/water solution has a ratio of about 47% sodium hydroxide to about 53% water.

7. A combination as claimed in claim 1, in which said sodium hydroxide/water solution has a freezing point plateau at about 41° F.

8. In combination, a container formed from a material resistant to degradation by the action of alkalis, a sodium hydroxide/water solution located within said container, and a nucleating device positioned in said solution and attached to a wall of said container, said nucleating device extending from the wall of said container inwardly into contact with said solution, said nucleating device comprising an element creating a magnetic field, and a magnetic material located in said field and magnetized thereby, said magnetic material being capable of nucleating said solution to inhibit supercooling thereof and being maintained on said element by the magnetic field.

9. A combination as claimed in claim 8, in which said magnetic material is in the form of particles of ferromagnetic material.

10. A combination as claimed in claim 8, in which said element is magnetic tape adhered to a rigid steel bar.

11. A combination as claimed in claim 10, in which said magnetic tape adheres to said bar by means of adhesive between said tape and said bar.

12. A combination as claimed in claim 8, in which said element is a bar or permanent magnet.

13. A combination as claimed in claim 12, in which said bar or permanent magnet is a bar of hard ferromagnetic material that has been magnetized to saturation.

14. A combination as claimed in claim 10, in which said magnetic material is commercially available magnetite.

15. A combination as claimed in claim 8, in which said nucleating device extends into contact with a wall of said container opposite that wall to which said device is attached.

* * * * *